United States Patent [19]

Louis

[11] Patent Number: 4,642,049
[45] Date of Patent: Feb. 10, 1987

[54] PROCESS FOR PREHEATING A COMBUSTIVE GAS BY MEANS OF COMBUSTION GASES AND PREHEATING DEVICE ASSOCIATED WITH A BURNER FOR CARRYING OUT THE SAID PROCESS

[75] Inventor: Raymond Louis, Montmagny, France
[73] Assignee: Gaz de France, France
[21] Appl. No.: 819,277
[22] Filed: Jan. 16, 1986
[30] Foreign Application Priority Data Jan. 22, 1985 [FR] France .................................. 85 00861

[51] Int. Cl.$^4$ ................................................. F28F 1/10
[52] U.S. Cl. ...................................... 432/223; 432/72; 431/215; 122/1 A
[58] Field of Search ............................ 432/29, 72, 223; 431/166, 167, 215; 237/55; 122/1 A

[56] References Cited

U.S. PATENT DOCUMENTS

| | | | |
|---|---|---|---|
| 1,213,820 | 1/1917 | Bergman | 110/265 |
| 2,524,843 | 10/1950 | Slifer et al. | 237/55 |
| 2,582,830 | 1/1952 | Hawley | 122/1 A |
| 2,744,733 | 5/1956 | Howes | 122/1 A |
| 4,102,632 | 7/1978 | Hastings | 432/223 |
| 4,310,303 | 1/1982 | Collier | 431/215 |
| 4,325,353 | 4/1982 | Husa | 237/55 |
| 4,416,254 | 11/1983 | DiPietro | 237/55 |
| 4,428,309 | 1/1984 | Chang | 110/265 |
| 4,572,084 | 2/1986 | Green et al. | 110/265 |

*Primary Examiner*—Henry C. Yuen
*Attorney, Agent, or Firm*—Steinberg & Raskin

[57] ABSTRACT

The present invention relates to a process and a device for preheating by combustion gases, a combustive gas intended to be mixed with a combustible gas before its combustion, comprising a box member containing a first, upper vertical exchanger in which the combustive gas is first heated by heat-exchange in counter-current relationship to itself and then in co-current relationship to the combustion gases, and a second exchanger incorporated in a burner and arranged below the first exchanger, the second exchanger allowing the combustive gas to be heated by heat exchange in co-current relationship and then in counter-current relationship to the combustion gases to finally be mixed with the combustion gas.

3 Claims, 3 Drawing Figures

PROCESS FOR PREHEATING A COMBUSTIVE GAS BY MEANS OF COMBUSTION GASES AND PREHEATING DEVICE ASSOCIATED WITH A BURNER FOR CARRYING OUT THE SAID PROCESS

BACKGROUND OF THE INVENTION

The present invention has essentially for a subject matter a process before preheating a combustive gas by means of combustion gases before its mixing with a combustible gas in a burner.

The invention is also directed to a preheating device associated with a burner for carrying out the said process.

There have already been proposed a certain number of technical solutions for recovering the heat of the combustion products issuing for example from a thermal container or space, for the purpose of heating the combustive gas before its mixing with the combustible gas flowing in the burner associated with the said thermal space.

As can be readily understood, such a heating of the combustive gas by means of the combustion products allows improving the efficiency of the process.

Among the solutions proposed hitherto, mention may be made of the so-called "self-recovering" burners, which use the heat of the combustion products to heat the combustive air at the location of the burner itself, before it is mixed with the combustible gas.

However, a burner of this kind suffers from a certain number of drawbacks, among which must be mentioned the diversion of part of the combustion gases which results in limiting the convective exchanges, the temperature limitations in use, and the high cost.

SUMMARY OF THE INVENTION

The present invention therefore has as its purpose to obviate particularly the above drawbacks by providing a new process and a new device for preheating the combustive gas, the said process and device considerably improving the heat exchanges between the combustion gases and the combustive gas, allowing almost the whole of the energy lost in the combustion gases to be recovered, offering very high reliability due to the fact that, in contrast to the prior burners, the members subjected to high temperatures are not metallic, and affording the advantages of high simplicity together with relatively low cost.

To this end, the invention has for a subject matter a process for preheating a combustive gas by means of combustion gases before its mixing with a combustible gas in a burner, characterized in that the combustive gas is first heated upstream of the burner by counter-current heat exchange with itself and then by co-current heat exchange with the combustion gases, and the said combustive gas is thereafter heated in the said burner by co-current heat exchange and thereafter counter-current heat exchange with the combustion gases to be finally mixed with the combustible gas, the combustion of which may serve to heat any desired thermal container, chamber or space.

According to another feature of the process of the invention, the combustive gas, after being preheated upstream of the burner, as also the combustion gases, are injected tangentially into the said burner to cause a rotation of the said gases with the heat exchange taking place in the burner.

Such a rotation advantageously promotes the heat exchanges between the combustion gases and the combustive gas in the region of the burner.

The invention is also directed to a preheating device associated with a burner for carrying out the above process, the said device being characterized by a box member containing a first heat exchanger for thermal exchange between the combustion gases and the combustive gas, and a second heat exchanger for thermal exchange between the combustion gases and the combustive gas, incorporated in the said burner, the first exchanger being arranged vertically above the assembly consisting of the burner and the second exchanger, and being provided with a heated combustive gas outlet and a combustion gas outlet, both of which are connected to the said assembly by means ensuring particularly the rotation of the said gases in the second exchanger.

Thus, the combination of the two recoveries of the heat of the combustion products in the first, upper vertical exchanger and in the second, lower exchanger incorporated in the burner, respectively, ensures particularly intensive convective exchanges resulting in a remarkably efficient heating of the combustive gas and therefore in an excellent efficiency of heating through combustion of the combustible gas.

According to another feature of the device of the invention, the said first exchanger includes a vertical axial combustive-gas supply duct opening into the upper portion of a first jacket topping and coaxially surrounding the said duct to thus define a space for the circulation of the combustive gas, whereas a second jacket coaxially surrounds the first jacket to thus define therewith a space for the circulation of the combustion gases.

According to still another feature of the device of the invention, the said second exchanger includes three concentric pipes coaxially surrounding a combustible gas supply duct and defining, on the one hand, an outer space and an inner space communicating with each other and in which the combustive gas circulates, and on the other hand, an intermediate space for the circulation of the combustion gases.

It is important to point out here that the space for the circulation of the combustive gas in the first exchanger communicates with the said outer space of the second exchanger through a duct tangentially connected to the outermost concentric pipe, and also that the space for the circulation of the combustion gases in the first exchanger communicates with the said intermediate space of the second exchanger through another duct tangentially connected to the intermediate concentric pipe.

According to still another feature of the device of the invention, the combustible gas supply duct has a substantially conical end with orifices communicating with the said inner space of the second exchanger, this space being defined by the innermost concentric pipe and the said supply duct.

According to a preferred form of embodiment, the said second jacket of the first exchanger is constituted by the said box member and by the wall of the thermal container, space or chamber, preferably provided at its upper portion with an opening communicating with the space for the circulation of the combustion gases in the said first exchanger.

It will also be pointed out here that the said box member is advantageously made of masonry based on refractory materials, so that the high-temperature combustion gases will not contact the metallic portions which might be deteriorated under the action of too high temperatures.

BRIEF DESCRIPTION OF THE DRAWINGS

But other features and advantages of the invention will appear more clearly as the following detailed description proceeds with reference to the appended drawings given solely by way of example and wherein.

DESCRIPTION OF THE PREFERRED EMBODIMENTS

Figure 1:
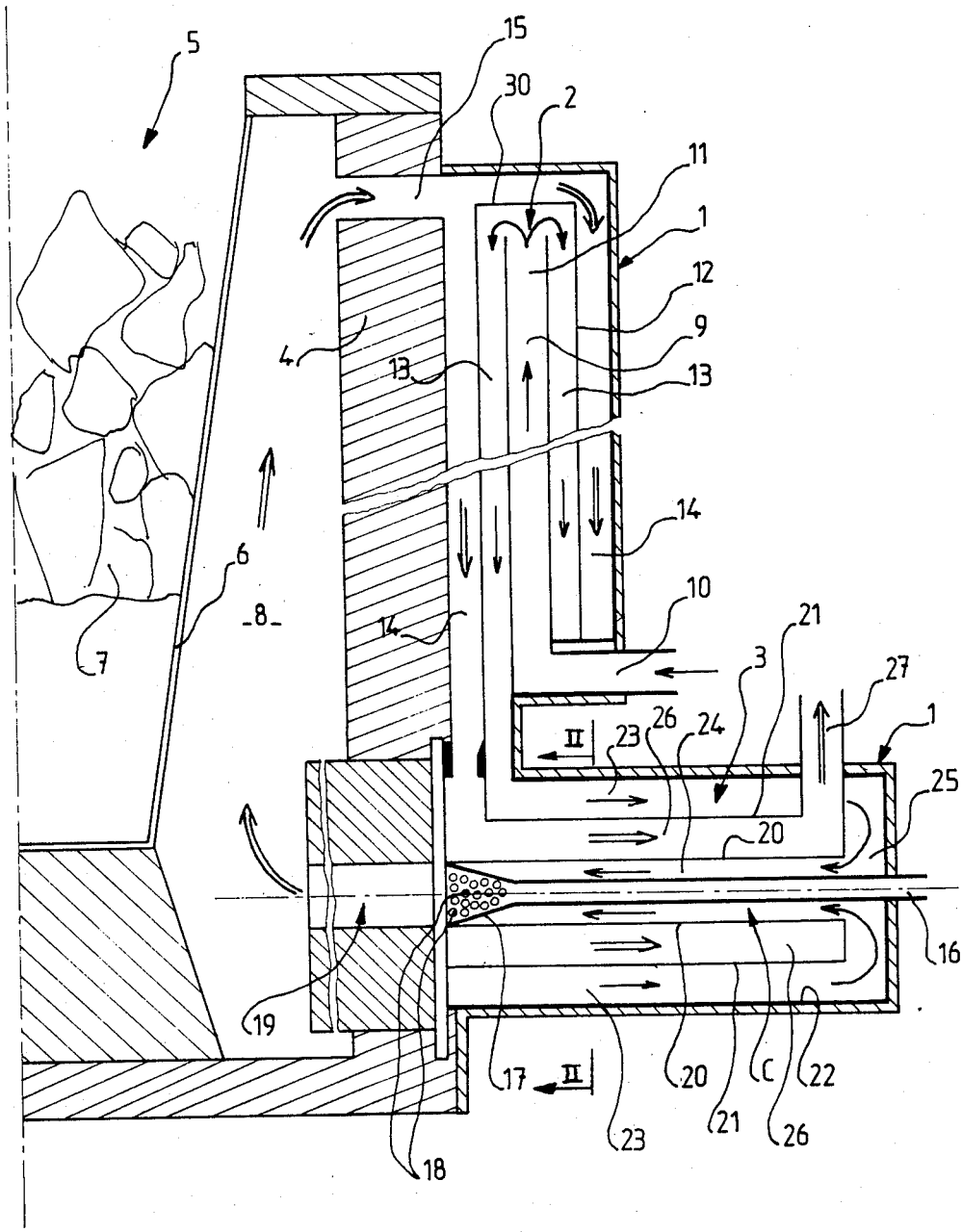
FIG. 1 is a diagrammatic, vertical sectional view of a device according to the invention associated with a thermal chamber shown partially.

According to one example of an embodiment and referring to FIG. 1, it is seen that a device according to the invention includes essentially a box member 1 containing a first, independent exchanger 2 and a second exchanger 3 associated with a burner, the first exchanger 2 being generally in the shape of a glove finger and being arranged vertically above the assembly constituted by the burner and the second exchanger 3.

The exchanger 2 is arranged vertically along the wall 4 of a furnace 5 which, according to the example of embodiment illustrated, is a melting furnace with a crucible 6 capable of receiving a charge 7 heated by the combustion gases circulating in the thermal space 8 formed between the crucible 6 and the furnace wall 4 which, as is known per se, is made of refractory material.

This primary or upper exchanger 2 includes a central or axial vertical duct 9 supplied with combustive gas, such as for example air, which is introduced through the inlet 10 of this duct into the lower portion of the exchanger 2. The duct 9 opens at its top portion 11 into a first jacket 12 coaxially topping and surrounding the duct 9 to define between itself and the said duct a space or path 13 for the circulation of the combustive gas.

A second jacket coaxially surrounds the first jacket 12 to define therewith a space 14 for the circulation of the combustion gases.

According to a preferred embodiment of an embodiment, the said second jacket is constituted by the box member 1 itself and by the wall 4 of the furnace 5 which, in a way, closes the box member 1. The space 14 communicates with the thermal chamber 8 through at least one opening 15 provided through the upper portion of the wall 4 as is clearly seen in FIG. 1.

It will be noted here that the glove-finger-shaped exchanger 2 offers a rather large exchange surface relatively to its small size, its dimensions depending on the height of the furnace 5. Furthermore, this system affords the possibility of choosing the point of combustion gas take-off, which allows improving the convective exchanges since the diversion of part of the combustion gases, which was inherent in the known self-recovering burners, is advantageously obviated.

The second exchanger 3 is associated with a burner supplied with combustible gas through a duct 16 terminating in a taper end 17 provided with orifices 18. As will be described later, the perforated conical portion 17 allows the mixing of the combustible gas with the preheated combustive air while at the same time stabilizing the combustion in the combustion chamber of the burner which is generally designated by the reference letter C. As is known per se, the burner is completed with a passage member 19 of refractory concrete in which the combustion develops intensively, the velocity of the gases at the outlet of the said passage member approximating 50 m/s.

The exchanger 3 incorporated in the burner includes three concentric pipes or jackets coaxially surrounding the combustible gas supply duct 16. More precisely, the reference numeral 20 designates the innermost pipe, the reference numeral 21 the intermediate pipe, and the reference numeral 22 the outermost pipe which, in the example of the embodiment illustrated, is constituted by the inner wall of the box member 1.

The outermost pipe 22 and the intermediate pipe 21 define an outer space 23, whereas the innermost pipe 20 and the duct 16 define an inner annular space 24. The outer space 23 and the inner space 24 communicate with one another, as seen at 25, and constitute a passage way for the heated combustive gas.

The intermediate and inner concentric pipes 21 and 20 define an intermediate space 26 in which the combustion gases circulate. It is therefore understood that the combustion gas circuit is, in a way, inserted between two combustive gas circuits. It will be noted here that the annular space 26 for the circulation of the combustion gases communicates with the external atmosphere through a chimney 27.

Figure 2:
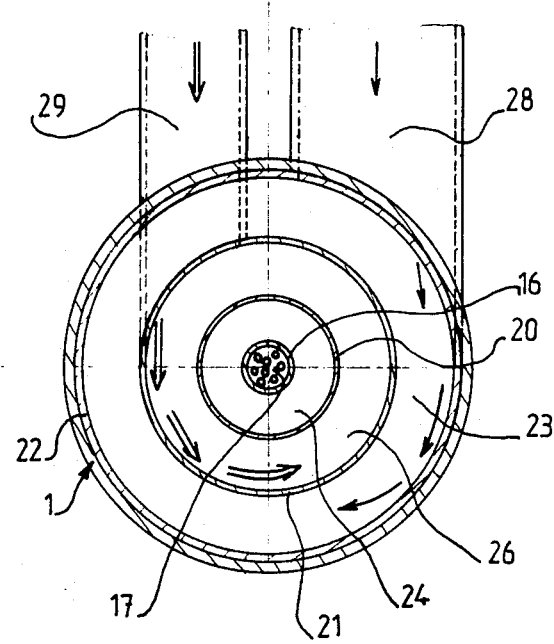
FIG. 2 is a sectional view upon the line II—II of FIG. 1.

As clearly appears from FIG. 2, the space 13 for the circulation of the combustive gas in the first exchanger 2 communicates with the outer space 23 of the second exchanger 3 through a duct 28 tangentially connected to the outermost concentric pipe 22, i.e. to the box member 1 in the example illustrated.

Likewise, the space 14 for the circulation of the combustion gases in the first exchanger 2 communicates with the intermediate space 26 in the second exchanger 3 through another duct 29 which also is tangentially connected to the intermediate concentric pipe 21.

Such tangential connection of the ducts 28 and 29 ensures the circulation and rotation of the combustive gas and the combustion gases in the exchanger 3, thus considerably improving the thermal exchanges.

The operation of the above-described device will now be explained in detail with reference to FIGS. 1 and 2, in which the path of the combustive air is shown by single-lined arrows and that of the combustion gases by double-lined arrows for a better understanding.

The combustive air admitted at 10 flows through the central duct 9 of the first exchanger 2 and then in the passage space or way 13 to thus undergo heat exchange in counter-current relationship to itself. It will be noted here that such counter-current circulation of the combustive gas results from the fact that the jacket 12 has an upper end 30 which is closed and, in a way, tops the opening end 11 of the duct 9.

The stream of combustive gas flowing through the space 13 is heated by heat exchange in parallel-current relationship to the combustion gases leaving the thermal container 8 through the opening 15 and circulating in the space 14.

The combustive air thereafter enters the exchanger 3 where it undergoes heat exchange in co-current relationship in the outer space 23 and then in counter-current relationship in the inner space 24 to the combustion gases circulating in the intermediate passage way 26, as is clearly indicated by the arrows in FIG. 1.

It will be pointed out here that, as a result of the tangential injection of the combustion gases through the duct 29, these gases are compactly applied to the intermediate wall or pipe 21 in contact with the co-current flow of combustive air in the outer space 23, which, as is readily understood, improves the exchanges. Likewise, the tangential injection of the combustive gas through the duct 28 allows it to be compactly applied to the concentric pipe 20 upon the return of the combustive gas to the inner space 24 in which it flows in counter-current relationship to the combustion gases and in co-current relationship to the combustible gas in the duct 16. It is therefore understood that the thermal exchange in the heat exchanger 3 is considerably intensified by the fact that the combustive air streams 23, 24 are in close contact with the pipes or walls 20, 21 between which the combustion gases circulate.

Consequently, the combustion chamber C of the burner is supplied with efficiently heated combustive air which mixes with the combustible gas so as to ensure high heating efficiency in the thermal container or space 8.

Of course, the burner is provided, as known per se, with electric ignition as well as appropriate means ensuring flame safety.

The device of the invention is capable of many applications, among which mention may be made of the forging furnaces, the metal heating furnaces, the bare-fire heat-treatment furnaces and crucible furnaces for the melting of various metals.

Figure 3:
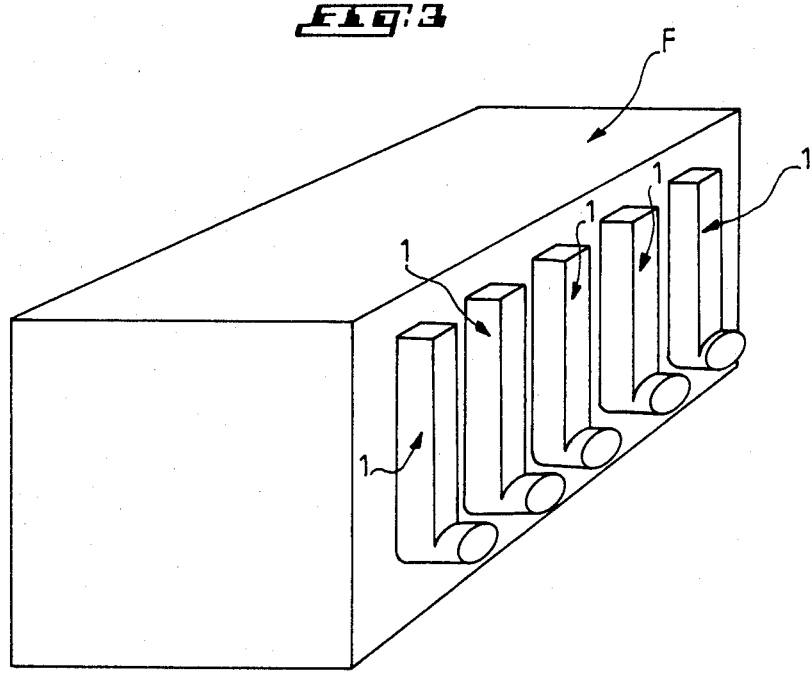
FIG. 3 is a very diagrammatic perspective view of a thermal chamber equipped with a battery of devices complying with the principle of the invention.

As can be seen in FIG. 3, a battery of devices designed according to the principles of the present invention can easily be arranged on a furnace F.

There is therefore obtained, according to the invention, a combustive gas preheating device associated with a burner, which is simple, compact, can be manufactured at a low cost and which is highly reliable and efficient from the point of view of the heat exchanges and of resistance to high temperatures, since all parts of the device which are subjected to high temperatures are no longer made of metal.

Moreover, the particular design of the device is such that it offers very large exchange surfaces while at the same time remaining very compact, and it also allows reducing the length of the supply pipings.

Of course, the invention is by no means limited to the form of embodiment described and illustrated which has been given by way of example only.

On the contrary, the invention includes all technical equivalents to the means described as well as their combinations if the latter are carried out according to its gist.

What is claimed is:

1. A device for preheating a combustive gas by combustion gases escaping from a thermal space, said device comprising in combination:
    a box member (1) comprising an inlet (15) for the combustion gases and an inlet (10) for the combustive gas;
    a first exchanger (2) contained in said box member and comprising: duct means (19) connected to the inlet (10) for the combustive gas; a first jacket (12) surrounding said duct means and defining therewith a first space (13) for the circulation of the combustive gas; and a second jacket surrounding said first jacket to define therewith a second space (14) connected to said inlet (15) for the combustion gases;
    a burner (C) comprising a combustible gas supply duct (16) and above which said first exchanger (2) is substantially vertically arranged;
    a second exchanger (3) incorporated in said burner and comprising three pipes: inner, intermediate and outer substantially concentric pipes (20, 21, 22) surrounding said supply duct and defining, an outer space (23) and an inner space (24) which contains said supply duct, said outer and inner spaces communicating with one another and with said first space (13) of said first exchanger, an intermediate space (26) communicating with said second space (14) of said first exchanger;
    means (28, 29) for providing rotation of the combustive gases and the combustion gas when they respectively pass from said first space (13) to said outer and inner spaces (23, 24) and from said second space (14) to said intermediate space (26) said means for providing rotation of the gases comprising a first duct (28) for providing communication between said first space (13) and said outer and inner spaces (23, 24), said first duct being tangentially connected to said outer concentric pipe (22), and a second duct (29) for providing communication between said second space (14) and said intermediate space (26), said second duct being tangentially connected to said intermediate concentric pipe (21) and wherein
    said combustible gas supply dict (16) has a substantially conical end (17) with orifices (18) communicating with said inner space (24) of said second exchanger (3), defined by said inner concentric pipe (20) and said supply duct.

2. A device according to claim 1, wherein said thermal space (8) comprises a wall provided with said inlet (15) for the combustion gases, and said second jacket of said first exchanger (3) is constituted by said wall and said box member applied onto said wall.

3. A device according to claim 1, wherein said box member is made of masonry based on refractory materials.

* * * * *